United States Patent
Asada et al.

(10) Patent No.: US 9,784,819 B2
(45) Date of Patent: Oct. 10, 2017

(54) PULSE COMPRESSION RADAR

(71) Applicant: Furuno Electric Co., Ltd., Nishinomiya (JP)

(72) Inventors: Yasunobu Asada, Nishinomiya (JP); Akinori Shimizu, Nishinomiya (JP); Eikoh Gotoh, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 351 days.

(21) Appl. No.: 14/429,345

(22) PCT Filed: Sep. 10, 2013

(86) PCT No.: PCT/JP2013/074309
§ 371 (c)(1),
(2) Date: Mar. 18, 2015

(87) PCT Pub. No.: WO2014/045928
PCT Pub. Date: Mar. 27, 2014

(65) Prior Publication Data
US 2015/0234036 A1  Aug. 20, 2015

(30) Foreign Application Priority Data
Sep. 19, 2012  (JP) ................. 2012-206033

(51) Int. Cl.
*G01S 7/28*      (2006.01)
*G01S 7/282*     (2006.01)
*G01S 7/285*     (2006.01)
*G01S 7/41*      (2006.01)
*G01S 13/02*     (2006.01)

(52) U.S. Cl.
CPC .............. *G01S 7/282* (2013.01); *G01S 7/285* (2013.01); *G01S 7/41* (2013.01); *G01S 13/02* (2013.01)

(58) Field of Classification Search
CPC ...... G01S 7/282; G01S 7/4004; G01S 7/4008; G01S 13/28; H03F 3/24; H03F 1/3247
(Continued)

(56) References Cited

U.S. PATENT DOCUMENTS 4,123,719 A * 10/1978 Hopwood ............... G01S 13/26
327/5
4,600,892 A * 7/1986 Wagner .................. G01S 7/023
327/155

(Continued)

FOREIGN PATENT DOCUMENTS

JP  S62159073 A  7/1987
JP  S64026178 A  1/1989
(Continued)

OTHER PUBLICATIONS

V. Perlin and H. G. Winful, "Pulse compression and amplification by stimulated Raman scattering in a nonlinear periodic structure," Conference on Lasers and Electro-Optics (CLEO 2000). Technical Digest. Postconference Edition. TOPS vol. 39 (IEEE Cat. No. 00CH37088), San Francisco, CA, USA, 2000, pp. 151-152.*

(Continued)

*Primary Examiner* — John B Sotomayor
(74) *Attorney, Agent, or Firm* — Alleman Hall Creasman & Tuttle LLP

(57) ABSTRACT

A radar apparatus for performing pre-distortion is provided, which has a configuration instantly transmittable of a transmission signal without distortion even in a case where a power is turned off. A radar apparatus (pulse compression radar) calculates a correction coefficient based on a transmission signal before distortion occurs therein and a transmission signal (feedback signal) outputted by a power amplifier. The radar apparatus corrects the transmission signal outputted by an ideal transmission signal memory while taking into consideration distortion that is caused in (Continued)

the amplification by the power amplifier, by using the correction coefficient. The radar apparatus includes a non-volatile memory configured to store the calculated correction coefficient as backup.

14 Claims, 5 Drawing Sheets

(58) Field of Classification Search
 USPC .................................................. 342/175, 189
 See application file for complete search history.

(56) References Cited

U.S. PATENT DOCUMENTS

| | | | | |
|---|---|---|---|---|
| 5,568,150 | A | * | 10/1996 | Taylor, Jr. ............. G01S 13/282 342/135 |
| 5,719,579 | A | * | 2/1998 | Torre ..................... G01S 13/222 342/13 |
| 2005/0179585 | A1 | * | 8/2005 | Walker ................ G01S 13/0209 342/134 |
| 2010/0007426 | A1 | * | 1/2010 | Ricketts .................. H03L 7/099 331/107 T |

FOREIGN PATENT DOCUMENTS

| | | |
|---|---|---|
| JP | 2008219136 A | 9/2008 |
| JP | 2011038948 A | 2/2011 |
| WO | 0108320 A1 | 2/2001 |

OTHER PUBLICATIONS

ISA Japanese Patent Office, International Search Report of PCT/JP2013/074309, dated Oct. 8, 2013, WIPO, 4 pages.

* cited by examiner

FIG. 3(A)

— IDEAL SIGNAL (AFTER PULSE COMPRESSION)
---- TRANSMISSION SIGNAL (AFTER PULSE COMPRESSION)

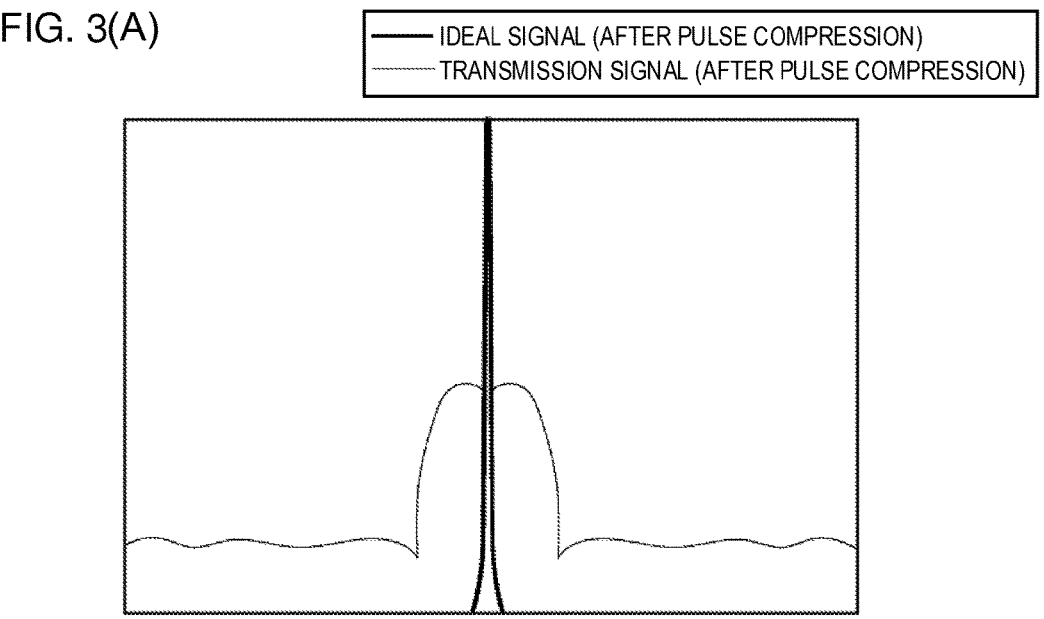

COMPARISON BETWEEN SIGNAL OBTAINED BY PULSE
COMPRESSING TRANSMISSION SIGNAL BEFORE PRE-DISTORTION
AND SIGNAL OBTAINED BY PULSE COMPRESSING IDEAL SIGNAL

FIG. 3(B)

— IDEAL SIGNAL (AFTER PULSE COMPRESSION)
---- TRANSMISSION SIGNAL (AFTER PULSE COMPRESSION)

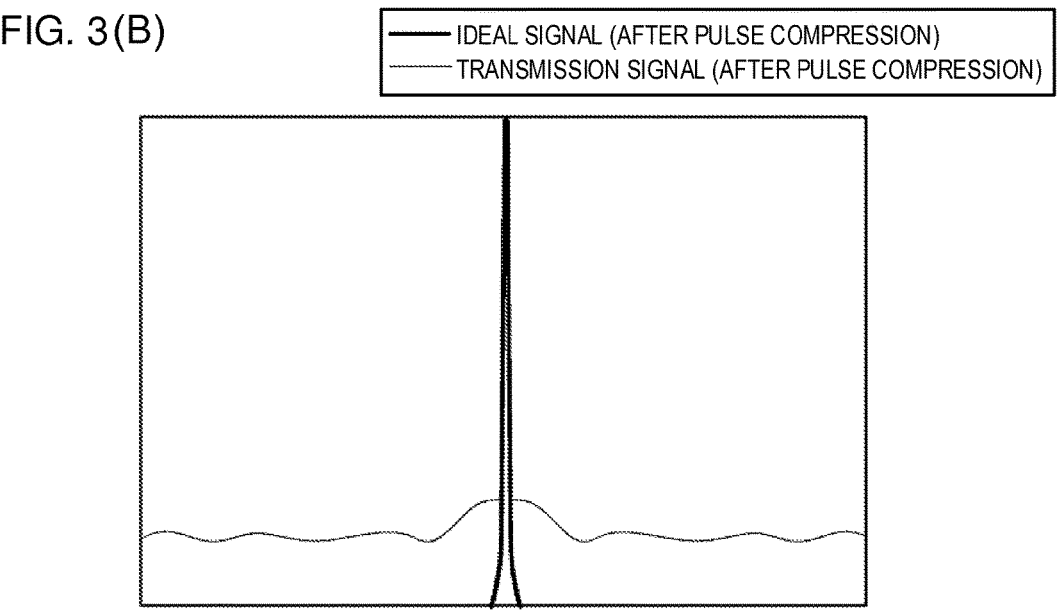

COMPARISON BETWEEN SIGNAL OBTAINED BY PULSE
COMPRESSING TRANSMISSION SIGNAL BEFORE PRE-DISTORTION
AND SIGNAL OBTAINED BY PULSE COMPRESSING IDEAL SIGNAL

PULSE COMPRESSION RADAR

TECHNICAL FIELD

This disclosure relates to a pulse compression radar, which performs pre-distortion.

BACKGROUND ART

Conventionally, pulse compression radars which perform processing of transmitting a pulse with a predetermined width and compressing the pulse width in reception are known. With the pulse compression radars, there are cases where a signal amplified by an amplifier (e.g., a power amplifier) is transmitted. However, when the signal is amplified, nonlinear distortion may occur. As a method of correcting the nonlinear distortion, pre-distortion is known.

In the pre-distortion, by feeding back a portion of a signal to be externally transmitted, nonlinear distortion is acquired, and a correction of the signal is performed by taking the distortion into consideration. Specifically, correction data is obtained based on the acquired distortion, and based on the correction data, a transmission signal before being amplified is corrected beforehand so as to obtain an ideal waveform after the amplification by the amplifier. In the above manner, the distortion of the transmission signal can be removed.

Patent Document 1 discloses a wireless device which performs the pre-distortion. This wireless device stores previous correction data (distortion compensation coefficient) and calculates the correction data based on the previous correction data to update it. In Patent Document 1, an example in which a memory, such as a RAM (Random Access Memory) is used as a memory which stores the correction data is described.

Patent Document 2 discloses a wireless reception device which removes distortion in a reception circuit which receives a signal, instead of by performing pre-distortion. The wireless reception device includes an FIR digital filter which performs filtering on the received signal. The FIR digital filter is changeable of a coefficient, and the coefficient is stored in a non-volatile memory.

REFERENCE DOCUMENT(S) OF CONVENTIONAL ART

Patent Document(s)

Patent Document 1: JP2001-008320A1
Patent Document 2: JP2008-219136A

DISCLOSURE OF THE INVENTION

Problems to be Solved by the Invention

Meanwhile, in pre-distortion, it is common to newly calculate correction data by utilizing correction data obtained immediately previously so as to update the correction data. Moreover, a load of the processing of calculating the correction data tends to be large, and in a case where the correction data is updated a plurality of times, it takes time to update.

Here, since the correction data is conventionally stored in the non-volatile memory, such as the RAM, in a case where the power is turned off, the correction data will be lost. In this case, a transmission signal with distortion is transmitted until appropriate correction data is calculated again.

Note that, Patent Document 2 discloses a configuration in which the coefficient of the FIR digital filter is stored in the non-volatile memory. However, Patent Document 2 only discloses the configuration on the side of receiving the signal, and hardly discloses for the signal transmission side (the side of performing the pre-distortion). Moreover, the coefficient of the FIR digital filter is not to be updated and is basically a coefficient of a type in which a value determined once is kept being used.

This disclosure is made in view of the above situations and aims to provide a radar apparatus for performing pre-distortion, which has a configuration instantly transmittable of a transmission signal without distortion even in a case where a power is turned off.

SUMMARY AND EFFECTS OF THE INVENTION

Problems to be solved by the present disclosure are described above, and means for solving the problems and effects thereof will be described below.

According to one aspect of this disclosure, a pulse compression radar having the following configuration is provided. Specifically, the pulse compression radar includes an ideal transmission signal memory, a transmission signal amplifying module, an antenna, a signal feedback circuit, a correction data calculating module, a non-volatile memory, and a transmission signal correcting module. The ideal transmission signal memory stores a transmission signal before distortion occurs therein (a transmission signal having an ideal waveform). The transmission signal amplifying module amplifies the transmission signal inputted thereto and output the amplified transmission signal. The antenna externally transmits the transmission signal outputted by the transmission signal amplifying module, and receives, as a reception signal, a reflection signal caused by the transmission signal. The signal feedback circuit feeds back, as a feedback signal, the transmission signal outputted by the transmission signal amplifying module. The correction data calculating module obtains correction data for cancelling the distortion that is caused by the amplification, based on the feedback signal and the transmission signal stored in the ideal transmission signal memory. The non-volatile memory is storable of the correction data. The transmission signal correcting module corrects the transmission signal outputted by the ideal transmission signal memory, based on the correction data.

Thus, the correction data can be kept even in a case where a power is turned off, since the non-volatile memory stores a correction coefficient. Therefore, a transmission signal with small distortion can be outputted from immediately after the pulse compression radar is activated.

The pulse compression radar preferably has the following configuration. Specifically, the pulse compression radar includes a signal processing module configured to obtain information regarding a target object based on the reception signal received by the antenna. A circuit configured to propagate, to the signal processing module, the reception signal received by the antenna shares at least a part thereof with a circuit configured to propagate the feedback signal to the correction data calculating module.

Thus, the circuit structure can be simplified and the cost can be lowered by reducing the number of components (e.g., mixers) that perform conversion and the like of the signal, since at least the part of the two circuits can be shared therebetween.

With the pulse compression radar, when the non-volatile memory receives an instruction to turn a power off, the non-volatile memory preferably stores the correction data.

Thus, the latest correction data can be stored. Therefore, a transmission signal with even smaller distortion can be outputted from immediately after the pulse compression radar is activated.

With the pulse compression radar, the non-volatile memory preferably stores the correction data according to a designed schedule.

Thus, even when the power is suddenly shut off, the correction data can be kept stored.

With the pulse compression radar, in changing a kind of the transmission signal to be transmitted, the non-volatile memory preferably stores the correction data at a timing before the change.

Thus, the latest correction data regarding the transmission signal before the change can be stored.

The pulse compression radar preferably has the following configuration. Specifically, the correction data is obtained by using a following coefficient indicating a speed of causing the feedback signal to follow the transmission signal stored in the ideal transmission signal memory. The correction data calculating module compares the transmission signal stored in the ideal transmission signal memory with the feedback signal, determines the following coefficient based on the comparison result, and calculates the correction data.

Thus, for example, even in a case where the transmission signal is significantly distorted due to a reason of not being activated for a long period of time or the like, by increasing the following coefficient described above, the distortion can be rapidly corrected. Further, when the distortion is canceled, the transmission signal can be stabilized by reducing the following coefficient.

With the pulse compression radar, the correction data calculating module preferably compares the transmission signal stored in the ideal transmission signal memory with the feedback signal, and preferably determines whether to recalculate the correction data based on the comparison result.

Thus, for example, a control becomes available, in which the correction data is updated by newly calculating the correction data when the distortion of the transmission signal is large, and the correction data previously obtained is utilized when the distortion of the transmission signal is small. Therefore, a load on the correction data calculating module can be reduced.

BRIEF DESCRIPTION OF DRAWING(S)

FIGS. 3(A) and 3(B) show charts indicating that distortion of the transmission signal is eliminated by pre-distortion.

Figure 4:
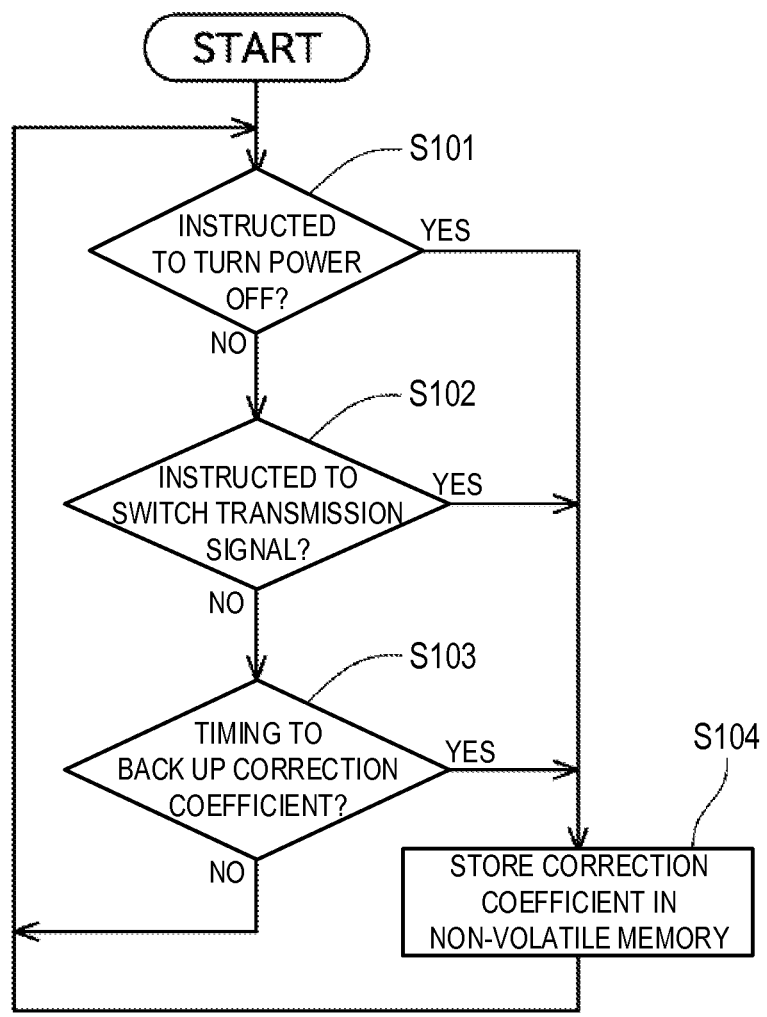

FIG. 4 is a flowchart illustrating processing of storing a correction coefficient in a non-volatile memory.

Figure 5:
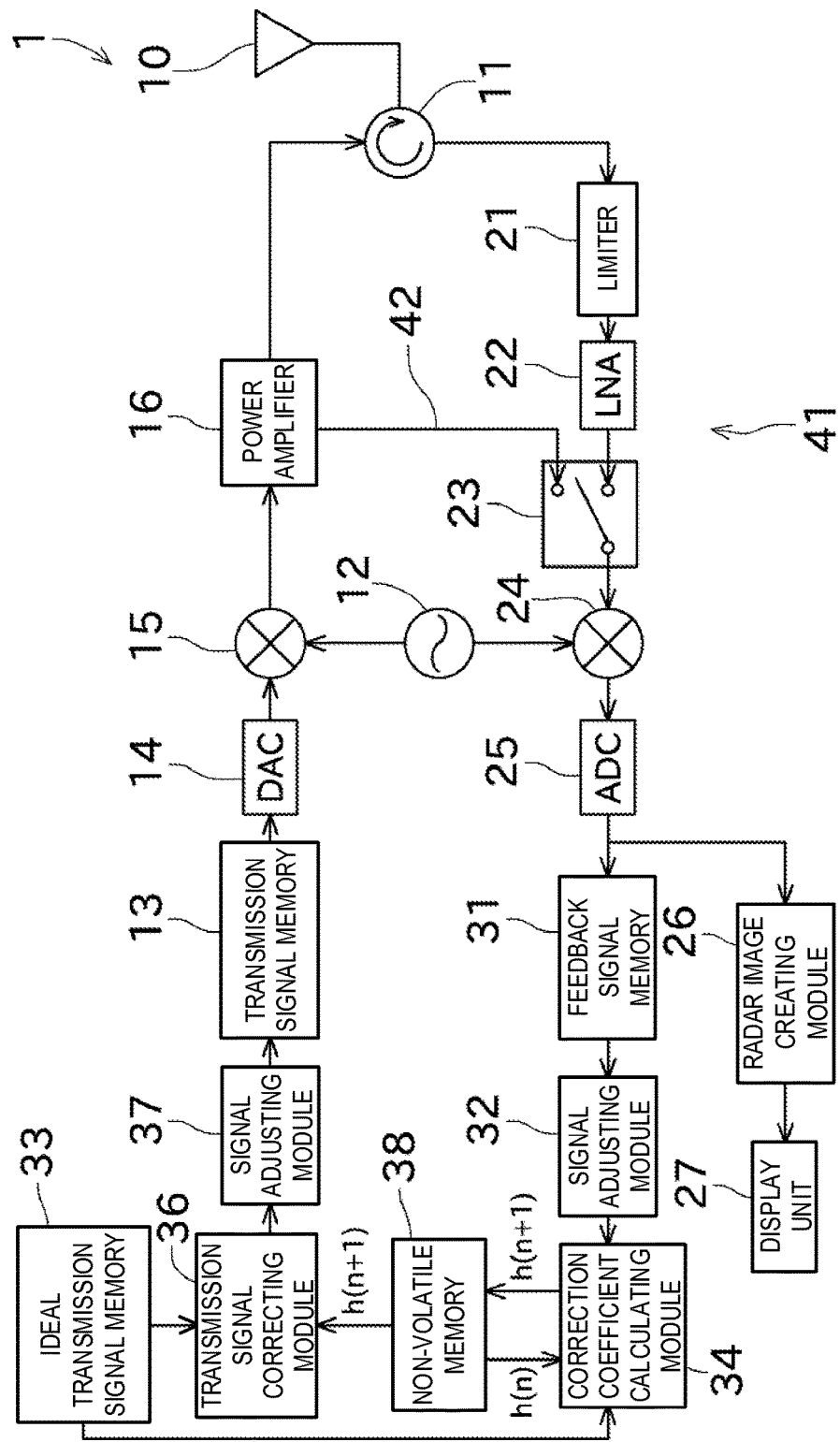

FIG. 5 is a block diagram of a radar apparatus having a configuration without the non-volatile memory.

MODE(S) FOR CARRYING OUT THE INVENTION

Figure 1:
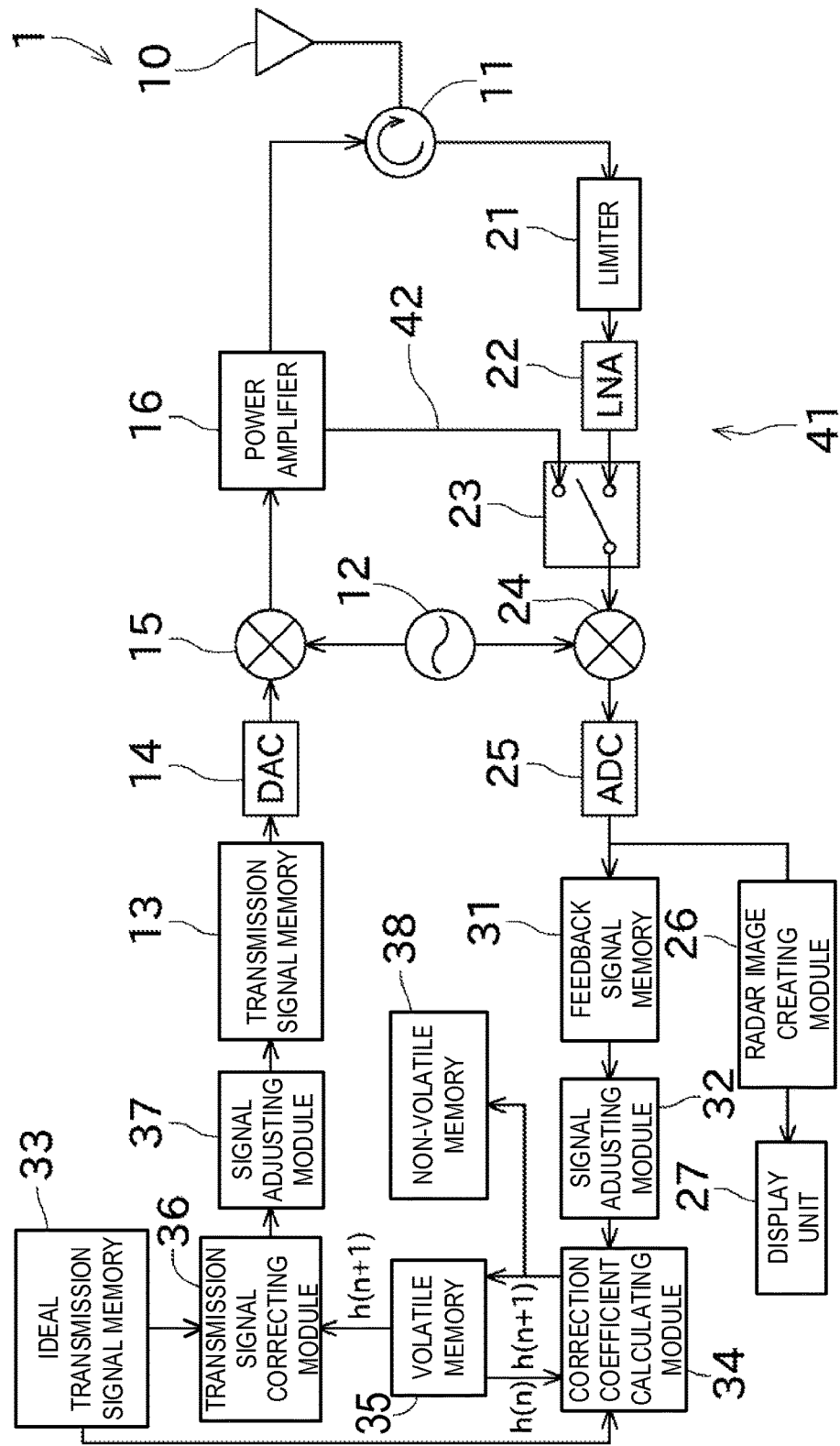
FIG. 1 is a block diagram of a radar apparatus according to one embodiment of this disclosure.

Next, one embodiment of this disclosure is described with reference to the drawings. FIG. 1 is a block diagram of a radar apparatus 1.

The radar apparatus 1 of this embodiment is a type of a pulse compression radar to be installed in a ship, and is detectable of a position and a speed of a target object by transmitting radio waves having a long pulse width and analyzing reception signals of the radio waves. Moreover, the radar apparatus 1 has a configuration of performing the pre-distortion described above. Hereinafter, a detailed configuration of the radar apparatus 1 is described.

The radar apparatus 1 stores a transmission signal that is performed with pre-distortion (the detailed correcting method is described later), in a transmission signal memory 13. Further, when a trigger pulse (transmission trigger) that determines a transmission timing of the transmission signal is generated, the transmission signal stored in the transmission signal memory 13 is outputted (see FIG. 2). As illustrated in FIG. 1, the transmission signal is externally outputted from an antenna 10 through a DAC 14, a mixer 15, a power amplifier (transmission signal amplifier) 16, and a circulator 11. Note that, the radar apparatus 1 is transmittable of other transmission signal with different pulse specification (changing behavior in pulse width and frequency), through a predetermined control by an operator.

The DAC 14 converts, from a digital signal into an analog signal, the transmission signal outputted from the transmission signal memory 13, and outputs the converted transmission signal to the mixer 15.

The mixer 15 mixes the transmission signal with a local oscillator signal (local oscillation signal) outputted from a local oscillator 12. Thus, a frequency of the transmission signal can be raised up to a transmission frequency. The mixer 15 outputs the transmission signal of which frequency is raised up, to the power amplifier 16.

The power amplifier 16 amplifies the transmission signal and externally outputs it from the antenna 10 through the circulator 11. Note that, due to the transmission signal being amplified by the power amplifier 16, nonlinear distortion may occur in the transmission signal. However, in this embodiment, since the transmission signal corrected (performed with the pre-distortion) by taking the distortion into consideration is inputted into the power amplifier 16, the radio wave without (with small) nonlinear distortion is transmitted as the transmission signal.

Note that, the transmission signal outputted from the power amplifier 16 is also outputted to a switch 23 via a signal feedback circuit 42. The transmission signal outputted to the switch 23 (feedback signal) is utilized for performing the pre-distortion.

The antenna 10 is configured to transmit the transmission signal as described above and receive, as the reception signal, a reflection signal caused by the transmission signal reflected on the target object (echo source) and returned therefrom. Moreover, the antenna 10 is configured to repeat the transception of the radio waves while rotating on the horizontal plane at a predetermined rotational speed. By the above configuration, the antenna 10 is scannable over 360° within the horizontal plane centering on the ship and acquirable of a state of the target object in the surroundings.

The circulator 11 is suitably switchable of a path of the signal such that the transmission signal with high energy from the power amplifier 16 is not inputted into a reception-side circuit and the reception signal is appropriately inputted into the reception-side circuit.

Next, a configuration of processing the reception signal received by the antenna 10 is described. The reception signal, after passing through the circulator 11, passes through a limiter 21, an LNA (Low Noise Amplifier, reception signal amplifier) 22, the switch 23, a mixer 24, and an ADC 25. Then, a radar image is created by a radar image creating module (signal processing module) 26, and the radar image is displayed on a display unit 27. Note that, in the following description, the path where the reception signal passes may be referred to as the reception circuit 41. Hereinafter, the respective components are described.

The limiter 21 prevents a signal with extremely high level from flowing into the post-stage components. The limiter 21 suppresses a signal with a predetermined signal level or higher, for example.

The LNA 22 performs processing of amplifying the signal level of the reception signal. By passing through the LNA 22, the signal level of weak reception signal can be amplified to the extent that the post-stage processing can be performed.

The switch 23 receives the reception signal outputted from the LNA 22 and the feedback signal outputted from the power amplifier 16. The switch 23 outputs one of these signals to the mixer 24 which is at the post-stage of the switch 23.

Figure 2:
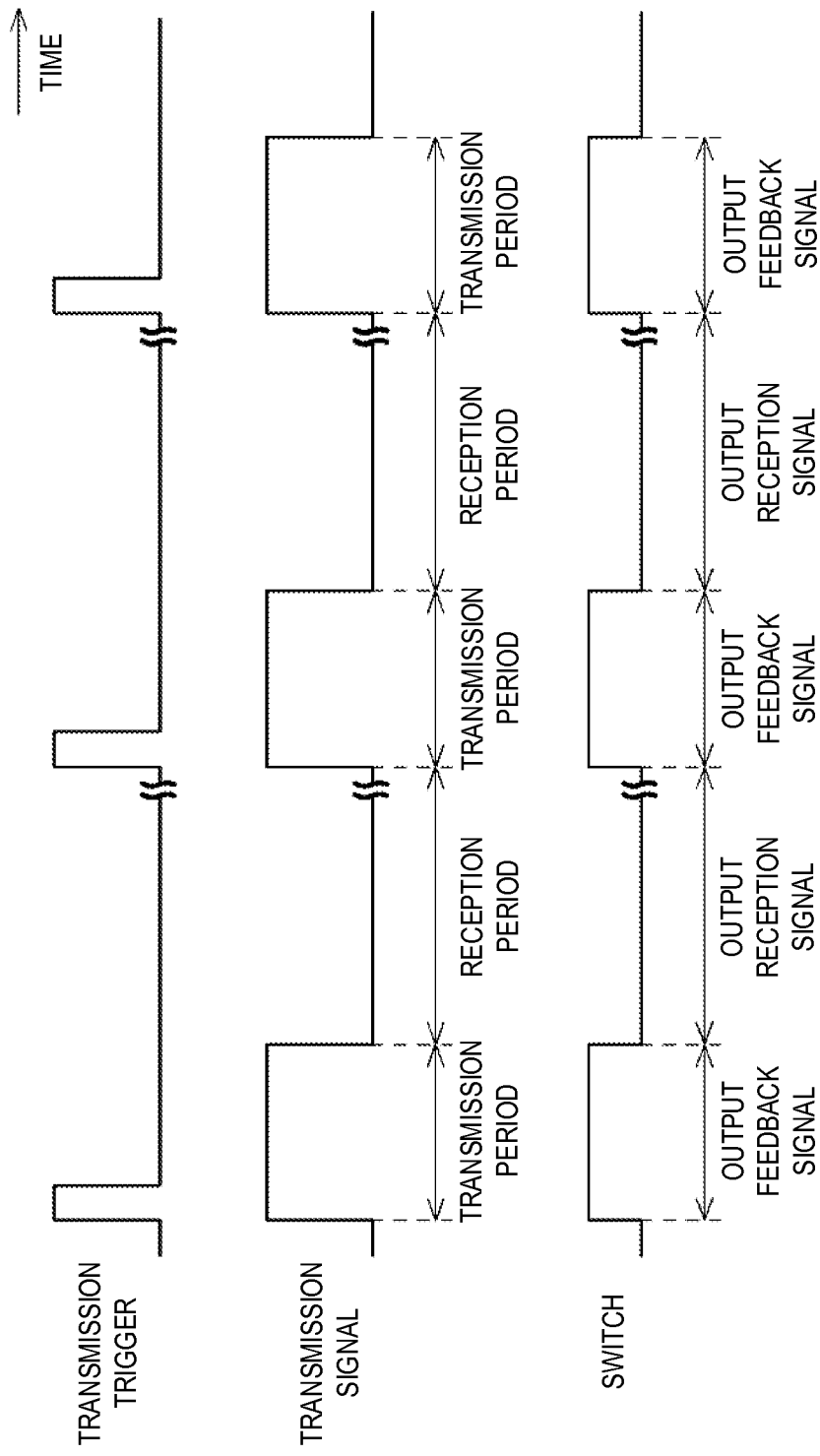
FIG. 2 is a timing chart of a transmission trigger, a transmission signal, and a switch.

As illustrated in FIG. 2, the switching timing of the switch 23 depends on a transmission timing of the transmission signal of the radar apparatus 1. In other words, the radar apparatus 1 switches, at a predetermined timing, a transmission period of transmitting the transmission signal and a reception period of receiving the reflection signal therebetween, and the radar apparatus 1 does not perform the transmission and the reception in parallel to each other. Further, when the radar apparatus 1 is in the transmission period, the switch 23 outputs the feedback signal to the mixer 24. On the other hand, when the radar apparatus 1 is in the reception period, the switch 23 outputs the reception signal to the mixer 24. Thus, even in the case where the feedback signal and the reception signal pass through the same path, the signals can be prevented from being mixed with each other.

The mixer 24, similar to the mixer 15, is able to drop the frequency of either one of the feedback signal and the reception signal, by mixing the either one of the feedback signal and the reception signal with the local oscillation signal of the local oscillator 12. The mixer 24 outputs the either one of the feedback signal and the reception signal of which the frequency is dropped, to the ADC 25.

The ADC 25 converts the either one of the feedback signal and the reception signal, from an analog signal into a digital signal. The ADC 25 outputs the feedback signal to a feedback signal memory 31 and outputs the reception signal to the radar image creating module 26.

By taking the transmission signal and the like into consideration, the radar image creating module 26 performs pulse compression on the reception signal inputted from the ADC 25 and creates the radar image based on the pulse-compressed signal. Specifically, the radar image creating module 26 obtains a distance to the target object from the antenna 10 based on a time difference between the timing at which the antenna 10 transmits the transmission signal and the timing at which the reflection signal is received. Moreover, the radar image creating module 26 acquires a direction of the target object based on a rotational phase (facing direction) of the antenna 10. In the above manner, the radar image creating module 26 creates the radar image.

The display unit 27 includes a liquid-crystal display, and is displayable of the radar image created by the radar image creating module 26.

Next, a configuration of performing the pre-distortion is described.

As the configuration of performing the pre-distortion, the radar apparatus 1 includes the feedback signal memory 31, a signal adjusting module 32, an ideal transmission signal memory 33, a correction coefficient calculating module (correction data calculating module) 34, a volatile memory 35, a transmission signal correcting module 36, a signal adjusting module 37, and a non-volatile memory 38.

As described above, the feedback signal memory 31 receives the feedback signal outputted from the switch 23. Although the feedback signal memory 31 receives the feedback signal every time the transmission signal is transmitted, the feedback signal is not updated while the correction coefficient calculating module 34 and the like perform the pre-distortion. Thus, even in a case where pre-distortion using a certain feedback signal has not yet completed but the next feedback signal is inputted into the feedback signal memory 31, the correction with the currently-used feedback signal can be performed.

The signal adjusting module 32 adjusts the feedback signal so as to suitably perform the pre-distortion by the correction coefficient calculating module 34 and the like. The signal adjusting module 32 performs, for example, processing of adjusting an amplitude and phase of the feedback signal so as to perform comparison. The feedback signal after the signal adjustment by the signal adjusting module 32 is outputted to the correction coefficient calculating module 34.

The ideal transmission signal memory 33 stores an ideal transmission signal (the transmission signal before distortion occurs, a reference signal, hereinafter referred to as the ideal signal) to be transmitted from the antenna 10 (specifically, stores a waveform of the ideal signal). The ideal signal is outputted to the correction coefficient calculating module 34.

The correction coefficient calculating module 34 receives the feedback signal after the adjustment and the ideal signal. The correction coefficient calculating module 34 calculates a correction coefficient required for the pre-distortion based on both of the signals. The correction coefficient is a coefficient quantitatively indicating a difference between the feedback signal and the ideal signal. In this embodiment, the correction coefficient calculating module 34 calculates a correction coefficient h(n) by performing operation of the following Equation (1).

$$h_n = h_{n-1} + \mu h_{n-1}(x-y)\bar{y} \tag{1}$$

Here, x is the ideal signal, y is the feedback signal, and μ is a step size (following coefficient). The step size is a coefficient that determines responsiveness (followability). Moreover, the current correction coefficient h(n) is obtained based on a correction coefficient h(n−1) obtained immediately previously. In other words, the correction coefficient calculating module 34 updates the correction coefficient over time by taking previous and current situations into consideration. Note that, the immediately-previous correction coefficient h(n−1) is stored by the volatile memory 35.

Here, how much the previous situation is taken into consideration is determined by μ (step size). If the step size is large, the current situation is prioritized, and thus, the difference between the ideal signal and the feedback signal can be rapidly corrected; however, the correction coefficient may diverge. On the other hand, if the step size is small, the possibility of the correction coefficient diverging is low; however, the difference between the ideal signal and the feedback signal cannot be rapidly corrected. The step size is determined by taking the above factors into consideration.

The correction coefficient calculating module 34 determines the correction coefficient as described above and outputs the correction coefficient to the transmission signal correcting module 36. Moreover, the volatile memory 35 stores a correction coefficient newly obtained by the correction coefficient calculating module 34 (updates the correction coefficient).

Moreover, the correction coefficient calculating module 34 stores the correction coefficient in the non-volatile memory 38 for backup according to a predetermined condition (described in detail later). For the non-volatile memory 38, other than a semiconductor memory, such as a flash memory or a ROM, a memory utilizing magnetism, light or the like may be adopted, for example.

The transmission signal correcting module 36 generates the transmission signal by adding predetermined distortion to the ideal signal beforehand through using the correction coefficient. The transmission signal generated by the transmission signal correcting module 36 is outputted to the signal adjusting module 37.

The signal adjusting module 37 adjusts, in corresponding with the DAC 14 which is at the post-stage thereof, a rate of the transmission signal and adjusts the amplitude of the transmission signal. The transmission signal adjusted by the signal adjusting module 37 is stored in the feedback signal memory 31.

The transmission signal stored in the feedback signal memory 31 is outputted in response to the transmission trigger as described above, amplified by the power amplifier 16, and then externally outputted.

Here, the transmission signal inputted into the power amplifier 16 is already performed with the pre-distortion (distorted beforehand) by the transmission signal correcting module 36. Therefore, due to the distortion caused by the power amplifier 16, the distortions cancel each other and the waveform of the transmission signal is approximated to the ideal signal.

With the radar apparatus 1 of this embodiment, the pre-distortion is performed as described above. Note that, when the feedback signal is newly inputted into the correction coefficient calculating module 34 and the like, they re-obtain the correction coefficient based on the feedback signal. The transmission signal correcting module 36 corrects the transmission signal by using the newly obtained correction coefficient. By repeating the pre-distortion as above, the distortion included in the transmission signal can be removed highly accurately.

FIGS. 3(A) and 3(B) schematically illustrate data indicating that the distortion of the transmission signal is eliminated by the pre-distortion. FIG. 3(A) is a chart in which a signal obtained by pulse compressing the transmission signal without being performed with the pre-distortion is compared with a signal obtained by pulse compressing the ideal signal. FIG. 3(B) is a chart in which a signal obtained by pulse compressing the transmission signal which is performed with the pre-distortion a sufficient number of times is compared with the signal obtained by pulse compressing the ideal signal. In the signal obtained by pulse compressing the transmission signal in FIG. 3(A), deterioration of directivity is caused by influence of the distortion. On the other hand, such deterioration is hardly seen in the signal obtained by pulse compressing the transmission signal in FIG. 3(B). In other words, the distortion of the transmission signal can be removed by the processing of this embodiment.

Next, a configuration of backing up the correction efficient is described. FIG. 4 is a flowchart illustrating the processing of storing the correction coefficient in the non-volatile memory.

As described above, it takes time to calculate the correction coefficient, and the distortion of the transmission signal cannot be removed unless the correction coefficient is updated a plurality of times. Therefore, with a conventional configuration, once the correction coefficient is lost due to, for example, a power being shut off, it takes time to transmit the transmission signal with small distortion. Moreover, the power amplifier 16 changes in properties depending on its duration of use, etc., and the distortion caused in the transmission signal changes due to the property change. In this embodiment, in consideration of the above points, the correction coefficient is stored in the non-volatile memory 38 at a predetermined timing. Hereinafter, this storing is described in detail.

When an instruction to turn off the power is received from the operator (S101), the correction coefficient calculating module 34 stores latest correction coefficient in the non-volatile memory 38 (S104). Moreover, also when an instruction to switch the transmission signal to the transmission signal with different pulse specification is issued (S102), the correction coefficient calculating module 34 stores latest correction coefficient of the currently-used transmission signal in the non-volatile memory 38 (S104).

Moreover, the radar apparatus 1 can design a timing (schedule) to back up the correction coefficient, for example, through a control of the operator. For example, every predetermined period of time, a specified timing, or when the correction coefficient is stabilized, can be given as an example of the designed timing. Further, the correction coefficient calculating module 34, when reaching the timing to carry out backup (S103), stores the latest correction coefficient in the non-volatile memory 38 (S104).

Note that, the number of the correction coefficients stored in the non-volatile memory 38 is not limited to one, and for example, a configuration in which the correction coefficient is stored for every pulse specification or a few of the latest correction coefficients are stored, may be adopted.

Next, processing that is performed by the correction coefficient calculating module 34 after the power is turned on is described.

When the power is turned on for the radar apparatus 1, the correction coefficient calculating module 34 accesses the non-volatile memory 38 and acquires the correction coefficient corresponding to the transmission signal to be transmitted. The correction coefficient calculating module 34 outputs the correction coefficient to the transmission signal correcting module 36. The transmission signal corrected by the transmission signal correcting module 36 is amplified by the power amplifier 16, and then is transmitted from the antenna 10.

Thus, the radar apparatus 1 is instantly transmittable of the transmission signal with small distortion by utilizing the correction coefficient stored in the non-volatile memory 38. However, for example, in a case where the power is not turned on for a long period of time or depending on an environmental change, a situation is considered, in which the distortion cannot sufficiently be removed even if the correction is performed with the correction coefficient stored in the non-volatile memory 38. In this embodiment, in consideration of this point, the following processing is performed.

That is, the correction coefficient calculating module 34 compares the ideal signal with the feedback signal and, as a result, if it determines that both of the signals are not approximated, the value of the step size is increased. Thus, the correction coefficient is calculated so that the feedback signal is rapidly approximated to the ideal signal (the distortion of the transmission signal is rapidly removed). Further, when the correction coefficient calculating module 34 compares both of the signals therebetween and if it determines that they are approximated, the correction coefficient calculating module 34 changes the value of step size back to the previous value. Thus, the correction coefficient is prevented from diverging. Note that, the change of the step size is not limited to be between two levels, but may be three or more levels.

Next, advantages in providing the signal feedback circuit 42 are described.

With the configuration without the signal feedback circuit 42, in addition to the mixer and the ADC for the pre-distortion circuit, a mixer and an ADC for a radar image creation circuit are required. On the other hand, in this embodiment, the configuration in which the pre-distortion circuit and the radar image creation circuit share a part of each other is provided. Therefore, the mixer 24 and the ADC 25 can be shared between both of the circuits. Thus, the number of the mixers and the ADCs can be reduced and, therefore, the cost can be lowered.

Moreover, with the configuration without the signal feedback circuit 42, since the local oscillation signal of the local oscillator 12 needs to be transmitted to three components, there is a possibility that the circuit structure becomes complicated. On the other hand, in this embodiment, since the local oscillation signal of the local oscillator 12 only needs to be transmitted to two components, the wiring can be implemented while effectively utilizing the space of the radar apparatus 1, and the circuit structure can be simplified.

Next, a control of reducing the load of the operation performed by the correction coefficient calculating module 34 is described. The operation of calculating the correction coefficient causes a comparatively high load, and therefore, a control can be performed as follows to have a configuration in which the correction coefficient is only calculated when necessary. Hereinafter, the control is described in detail.

When this control is performed, the correction coefficient calculating module 34 compares the ideal signal with the feedback signal before calculating the correction coefficient and determines whether both of the signals are approximated. Further, if the correction coefficient calculating module 34 determines that both of the signals are approximated, the distortion of the transmission signal is considered to be sufficiently removed and does not calculate the correction coefficient. In this case, the transmission signal correcting module 36 performs the pre-distortion by using the previously-obtained correction coefficient.

On the other hand, if the correction coefficient calculating module 34 determines that both of the signals are not approximated, the distortion of the transmission signal is considered to be not sufficiently removed and calculates the correction coefficient. In this case, the transmission signal correcting module 36 performs the pre-distortion by using the newly-obtained correction coefficient.

By performing the above control, the load on the correction coefficient calculating module 34 can be reduced. Note that, the comparison between the signals is not necessarily performed every time the feedback signal is inputted, and for example, when the both of the signals are approximated, the signals may be compared every predetermined number of times the feedback signal is inputted.

As described above, the radar apparatus 1 includes the ideal transmission signal memory 33, the power amplifier 16, the antenna 10, the signal feedback circuit 42, the correction coefficient calculating module 34, the non-volatile memory 38, and the transmission signal correcting module 36. The ideal transmission signal memory 33 stores the transmission signal before the distortion occurs therein. The power amplifier 16 amplifies the inputted transmission signal and outputs the amplified transmission signal. The antenna 10 externally transmits the transmission signal outputted from the power amplifier 16 and receives the reflection signal of the transmission signal, as the reception signal. The signal feedback circuit 42 feeds back the transmission signal outputted from the power amplifier 16 as the feedback signal. The correction coefficient calculating module 34 obtains the correction coefficient for canceling the distortion caused by the amplification, based on the feedback signal and the transmission signal stored in the ideal transmission signal memory 33. The non-volatile memory 38 is storable of the correction coefficient. The transmission signal correcting module 36 corrects the transmission signal outputted from the ideal transmission signal memory 33, based on the correction coefficient.

Thus, the correction coefficient can be kept even when the power is turned off, since the non-volatile memory 38 stores the correction coefficient. Therefore, the transmission signal with small distortion can be outputted from immediately after the radar apparatus 1 activated.

Although the suitable embodiment of this disclosure is described above, the above configurations may be modified as follows, for example.

In the above embodiment, the configuration in which the volatile memory 35 stores the correction coefficient for the operation, and the non-volatile memory 38 stores the correction coefficient as backup is adopted. Alternative to this, as illustrated in FIG. 5, a configuration in which the non-volatile memory 38 stores the correction coefficient for the operation and backup may be adopted.

The signal amplifier is not limited to the power amplifier 16, and any component may be used as long as there is a possibility of causing distortion in the transmission signal.

The correction data calculating module (correction coefficient calculating module 34) may have any configuration as long as the correction data required for performing the pre-distortion is calculated, and the correction data may be calculated by a method other than Equation (1). Moreover, the correction data calculating module does not necessarily calculate the "coefficient," and may have any configuration as long as some sort of data required for the correction is calculated. Note that, the storing target of the volatile memory 35 and the non-volatile memory 38 is also similarly not limited to the correction coefficient.

Processing that a component other than the correction coefficient calculating module 34 stores the correction coefficient in the non-volatile memory 38 may be performed.

The signal processing module (radar image creating module 26) may have any configuration as long as the information regarding the target object is obtained, and may have a configuration of obtaining only the position of the target object without creating the radar image.

The configuration illustrated in the block diagram of FIG. 1 is an example, and as long as the configuration of this disclosure is provided, suitable addition, omission, change in position and the like of the components may be implemented. For example, a configuration in which a high-pass filter is provided at a post-stage of the ADC 25 may be provided.

This disclosure is not limited to the radar apparatus for ships, and is applicable to radar apparatuses to be installed in other movable bodies, such as aircrafts. Moreover, other than the application to be installed in the movable bodies, it is applicable to radar apparatuses for ship course surveillance.

DESCRIPTION OF REFERENCE NUMERAL(S)

1 Radar Apparatus (Pulse Compression Radar)
13 Transmission Signal Memory
16 Power Amplifier (Transmission Signal Amplifier)
21 Limiter
22 LNA
23 Switch
24 Mixer
25 ADC
31 Feedback Signal Memory
33 Ideal Transmission Signal Memory
34 Correction Coefficient Calculating Module (Correction Data Calculating Module)
35 Volatile Memory
36 Transmission Signal Correcting Module
38 Non-volatile Memory

What is claimed is:

1. A pulse compression radar, comprising:
an ideal transmission signal memory configured to store a transmission signal before distortion occurs therein;
a transmission signal amplifier configured to amplify the transmission signal inputted thereto and output the amplified transmission signal;
an antenna configured to externally transmit the transmission signal outputted by the transmission signal amplifier, and receive, as a reception signal, a reflection signal caused by the transmission signal;
processing circuitry configured:
to feed back, as a feedback signal, the transmission signal outputted by the transmission signal amplifier; and
to obtain correction data for cancelling the distortion that is caused by the amplification, based on the feedback signal and the transmission signal stored in the ideal transmission signal memory; and
a non-volatile memory configured to store the correction data; wherein
the processing circuitry is further configured to correct the transmission signal outputted by the ideal transmission signal memory, based on the correction data,
wherein when the non-volatile memory receives an instruction to turn a power off, the non-volatile memory stores the correction data.

2. The pulse compression radar of claim 1, comprising a signal processing module configured to obtain information regarding a target object based on the reception signal received by the antenna,
wherein a circuit configured to propagate, to the signal processing module, the reception signal received by the antenna shares at least a part thereof with a circuit configured to propagate the feedback signal to the processing circuitry.

3. The pulse compression radar of claim 1, wherein the non-volatile memory stores the correction data according to a designed schedule.

4. The pulse compression radar of claim 1, wherein in changing a kind of the transmission signal to be transmitted, the non-volatile memory stores the correction data at a timing before the change.

5. The pulse compression radar of claim 1, wherein the correction data is obtained by using a following coefficient indicating a speed of causing the feedback signal to follow the transmission signal stored in the ideal transmission signal memory, and
wherein the processing circuitry compares the transmission signal stored in the ideal transmission signal memory with the feedback signal, determines the following coefficient based on the comparison result, and calculates the correction data.

6. The pulse compression radar of claim 1, wherein the processing circuitry compares the transmission signal stored in the ideal transmission signal memory with the feedback signal, and determines whether to recalculate the correction data based on the comparison result.

7. The pulse compression radar of claim 2, wherein the non-volatile memory stores the correction data according to a designed schedule.

8. The pulse compression radar of claim 7, wherein in changing a kind of the transmission signal to be transmitted, the non-volatile memory stores the correction data at a timing before the change.

9. The pulse compression radar of claim 8, wherein the correction data is obtained by using a following coefficient indicating a speed of causing the feedback signal to follow the transmission signal stored in the ideal transmission signal memory, and
wherein the processing circuitry compares the transmission signal stored in the ideal transmission signal memory with the feedback signal, determines the following coefficient based on the comparison result, and calculates the correction data.

10. The pulse compression radar of claim 9, wherein the processing circuitry compares the transmission signal stored in the ideal transmission signal memory with the feedback signal, and determines whether to recalculate the correction data based on the comparison result.

11. The pulse compression radar of claim 2, wherein the non-volatile memory stores the correction data according to a designed schedule.

12. The pulse compression radar of claim 2, wherein in changing a kind of the transmission signal to be transmitted, the non-volatile memory stores the correction data at a timing before the change.

13. The pulse compression radar of claim 2, wherein the correction data is obtained by using a following coefficient indicating a speed of causing the feedback signal to follow the transmission signal stored in the ideal transmission signal memory, and
wherein the processing circuitry compares the transmission signal stored in the ideal transmission signal memory with the feedback signal, determines the following coefficient based on the comparison result, and calculates the correction data.

14. The pulse compression radar of claim 2, wherein the processing circuitry compares the transmission signal stored in the ideal transmission signal memory with the feedback signal, and determines whether to recalculate the correction data based on the comparison result.

* * * * *